United States Patent [19]

Root

[11] 3,998,038
[45] Dec. 21, 1976

[54] FRUIT PICKER

[76] Inventor: Arthur A. Root, 2972 Solar Lane, Rte. 1, San Marcos, Calif. 92069

[22] Filed: Sept. 2, 1975

[21] Appl. No.: 609,587

[52] U.S. Cl. .................................................. 56/336
[51] Int. Cl.² ........................................ A01D 46/24
[58] Field of Search ............................. 56/332–340

[56] References Cited

UNITED STATES PATENTS

| | | | |
|---|---|---|---|
| 497,202 | 5/1893 | Ohman | 56/340 |
| 787,164 | 4/1905 | Fisher, Jr. | 56/340 |
| 1,053,789 | 2/1913 | DeCoster et al. | 56/334 |
| 1,088,295 | 2/1914 | Quick et al. | 56/340 |
| 1,223,601 | 4/1917 | Mitchell | 56/340 |
| 1,852,940 | 4/1932 | Statom | 56/336 |

*Primary Examiner*—Russell R. Kinsey
*Attorney, Agent, or Firm*—Brown & Martin

[57] ABSTRACT

A fruit picker having an elongated pole with a remotely operable cutter at one end, and a fruit conducting and collecting sleeve coextensive with the pole for carrying fruit safely from the cutter to a collecting pocket at the other end. The sleeve has an open mouth under the cutter to receive detached fruit, which then travels down the sleeve to the pocket, the speed of travel being retarded by one or more restrictions formed in the compliant material of the sleeve by adjustable encircling bands. The collecting pocket has a flap which can be opened and closed from any position along the pole to unload collected fruit from the pocket.

2 Claims, 6 Drawing Figures

FRUIT PICKER

BACKGROUND OF THE INVENTION

Tree grown fruit, such as avocadoes, citrus, apples and the like must often be picked from elevated places that are reachable only with the use of a ladder and a picking device. Picking poles, having a cutter or puller at one end are in common use, the fruit either falling directly to the ground or being collected in a bag attached to the pole under the cutter. Fruit falling to the ground may be bruised or otherwise damaged, which reduces the value of the harvest. By collecting the fruit in a bag, the bruising problem is to some extent alleviated, but the collection of fruit in a bag at the upper end of the picking pole presents other problems. The bag fills rather quickly and it must be dumped at relatively frequent intervals into a container on the ground, or into one supported on the back of the worker. To dump into a ground container, the bag must be lowered and inverted, and usually the worker must descend from a ladder to empty the bag in this manner.

The more common method is for the worker to empty the fruit into a container draped over his shoulder. This requires him to lower the pole and manipulate the bag to disgorge the fruit, which is time consuming and forces the worker to assume an ever increasing weight burden that tires him and decreases his efficiency. It becomes quite difficult to maneuver the pole while bearing the weight of all of the collected fruit, particularly when collected in a bag under the cutter. This creates a large inertial force on the pole that the worker must contend with and maneuvering between branches in opposition to this force can be quite burdensome. Furthermore, the bag itself is an impediment to maneuvering since it is not easily passed through the tree limbs, while the bag also interferes with the worker's visibility, making it difficult for him to properly place the cutter.

Some of the devices in use incorporate a sleeve or chute that is employed to transport the picked fruit to a ground collector. The fruit must fall a substantial distance in the chute for collection at the lower end thereof and if the fruit drops too rapidly it is subject to bruising. Accordingly, some of the devices have been equipped with internally arranged baffles to slow the fruit. However, since they are not usually adjustable, different chutes or baffle arrangements for different sizes of fruit must be utilized. Furthermore, leaves and twigs are often cut along wth the fruit and accumulate in the baffles, causing obstruction of the chute which is tedious to clear.

SUMMARY OF THE INVENTION

The apparatus is utilized in conjunction with conventional type of picking pole having a cutter mounted on the upper end of the pole. A pull cord is longitudinally disposed along the picking pole and is pulled by the worker to actuate the cutter and sever the fruit from the tree.

A sleeve of compliant fabric material is attached coextensively to the pole, the upper end being held on a rigid ring member which forms an open mouth in the sleeve under the cutter. Constrictor means is applied to the sleeve at one or more stations along the length of the sleeve, the constrictor means being in the form of an adjustable elastic band that constricts the cross sectional area of the sleeve at that station. The constriction causes the fruit to squeeze against the walls of the sleeve and reduces its speed of descent. Depending upon the type of fruit to be cut, there may be one or several constrictors utilized to slow the descent of the fruit picked. For instance, apples are particularly sensitive to bruising and several constrictors would be utilized to modulate the descent of the fruit.

The collecting pocket at the lower end of the sleeve is formed by an enlarged portion of the sleeve, with a stiffener which holds the pocket open. A flap, integral with the sleeve, closes the pocket to retain the fruit until a sufficient quantity is collected. In the closed position, the flap is rolled up or folded over the pocket and held by an actuating cord extending along the pole. The actuating cord is arranged in an endless configuration and is coupled to the flap by a semi-rigid connector, with locking means for holding the flap closed. The flap can be opened or closed by manipulating the actuating cord from any position along the pole, enabling a worker to remain on a ladder and lower the pocket end of the pole to the ground for unloading fruit. Collection of the fruit at the lower end of the pole not only avoids excess weight at the upper end, but also provides some balancing of the pole which facilitates handling.

The primary object of this invention, therefore, is to provide a new and improved fruit picker.

Another object of the invention is to provide a new and improved fruit picking pole with an attachment that eliminates bruising fruit during collection.

Another object of the invention is to provide a new and improved fruit picker that collects fruit in a sleeve extending along the picking pole and controls the travel of the fruit through the sleeve.

Another object of the invention is to provide a new and improved fruit picker in which fruit is collected at the lower end of the sleeve in a storage pocket, and unloaded when the pocket is filled.

Another object of the invention is to provide a new and improved fruit picker wherein unloading of the pocket may be actuated from any position along the pole.

These and other objects of the invention will be apparent in the following detailed description, taken in conjunction with the accompanying drawings, in which.

DETAILED DESCRIPTION OF THE DRAWINGS

Figure 1:
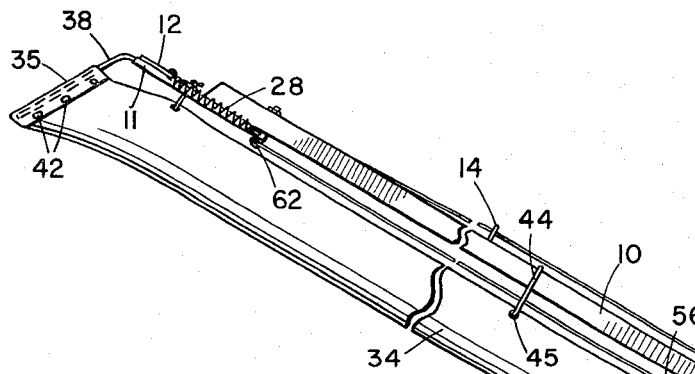
FIG. 1 is a side elevation view of the picker assembly.

The picking pole 10 is illustrated as comprising an elongated tubular member of square cross section, with a cutter 12 attached to the upper end of the pole by means of a support member 11. The cutter 12 is pivoted on a pin 18 and is actuated by a pull rod 13 that is guided in an eye 14 on the side of the pole. A cutter pull cord 16 is attached to pull rod 13 and extends along picking pole 10 through other suitably spaced eyes 14. Pulling the cutter pull cord 16 pivots the cutter 12 about the pivot pin 18, causing the cutting edge 22 to scissor against the anvil portion 26 of support member 11 and sever the stem of a fruit trapped in the slot 20 of the cutter. A spring 28 has one end 30 connected to cutter 12 and the other end connected to an eye 32 fixed on pole 10, to open the cutter when pull cord 16 is released. Thus far the structure described is typical of picking poles in present use and may vary in detail.

Coextensive with pole 10 is a sleeve 34 of compliant fabric material, or the like. At the upper end the sleeve has an open mouth 35 formed by folding the end of the sleeve around a ring member 38, secured by legs 40 to the support member 11. The end of the sleeve can be fastened to the ring member by snap fasteners 42, or similar means. The major portion of the sleeve 34 has a closed seam 36 and is attached to the pole 10 by attachment members 44. As illustrated, the attachment members are ties, such as plastic covered wire, which pass through reinforcing grommets 45 in the sleeve and are wrapped around the pole.

Figure 2:
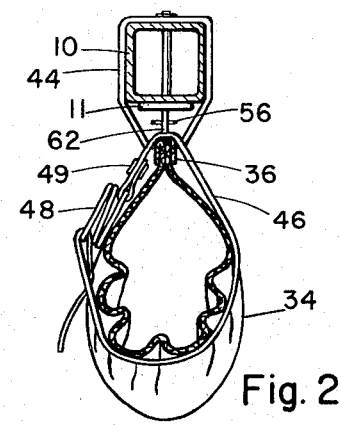
FIG. 2 is an enlarged sectional view taken on line 2—2 of FIG. 1.
Figure 3:
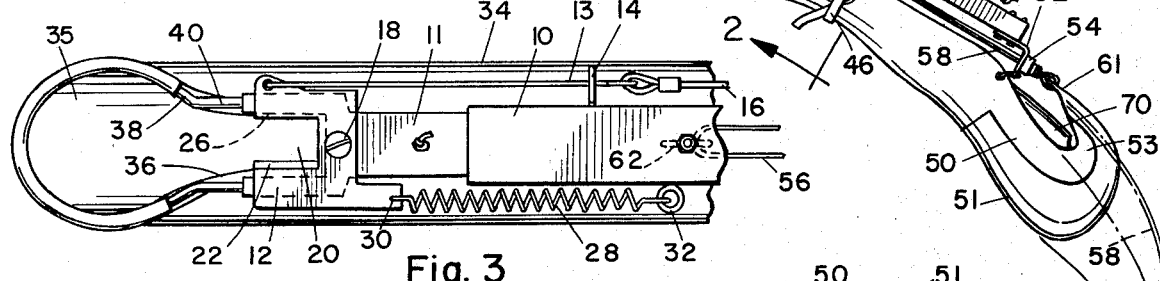
FIG. 3 is an enlarged top plan view of the left hand end of FIG. 1.
Figure 4:
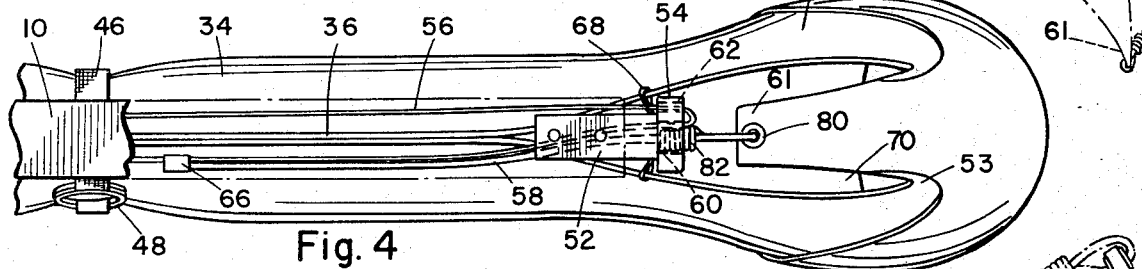
FIG. 4 is an enlarged top plan view of the right hand end of FIG. 1.

At one or more positions along its length, the sleeve 34 is constricted by an encircling constricting band 46, preferably of elastic material. To facilitate adjustment of the constriction, the ends of the band 46 are held by clamp means, such as the split key ring 48 in FIG. 2. One end of constricting band 46 is secured to ring 48 by a snap fastener 49 and the other end is held frictionally between the coils of the ring. Other fastening means, such as a buckle, may be equally suitable. The constricting band 46 gathers the material of the sleeve and reduces the cross sectional area, so that the falling fruit is frictionally retarded. The resiliency of the band allows for some variation in the size of the fruit.

At the lower end of the sleeve 34 is a pocket 50, formed by return folding a flap 53 which is the extended end of the sleeve. An additional layer of material or doubler 51 on the outside of the pocket 50 holds the shape and reinforces the pocket to hold a quantity of fruit. At the entry into pocket 50, seam 36 opens and the edges of the sleeve are separated by a stiffener 70 of stiff material to prevent the sleeve from closing and restricting entry. The stiffener 70 is normally arched upwardly and flares from a narrow entry end 72 to a wide exit end 74, providing easy entry for fruit into the pocket.

On the lower end of pole 10 is a bracket 52, secured by bolts 55 or similar means. To hold the pocket in place, the sleeve 34 is secured to bracket 52 by a tie member 68 passing through a grommet 45 in the sleeve and through a hole 69 in the bracket. Secured to bracket 52 is a collar 54, which provides direction reversing and locking means for the pocket flap action. The flap 53 is controlled by an endless actuating cord 56 extending substantially the full length of pole 10. Adjacent the upper end of the pole the actuating cord 56 passes through an eyebolt 62 fixed to the pole. At the lower end the actuating cord is return threaded through a pair of side by side holes 60 and 62 in collar 54.

Figure 5:
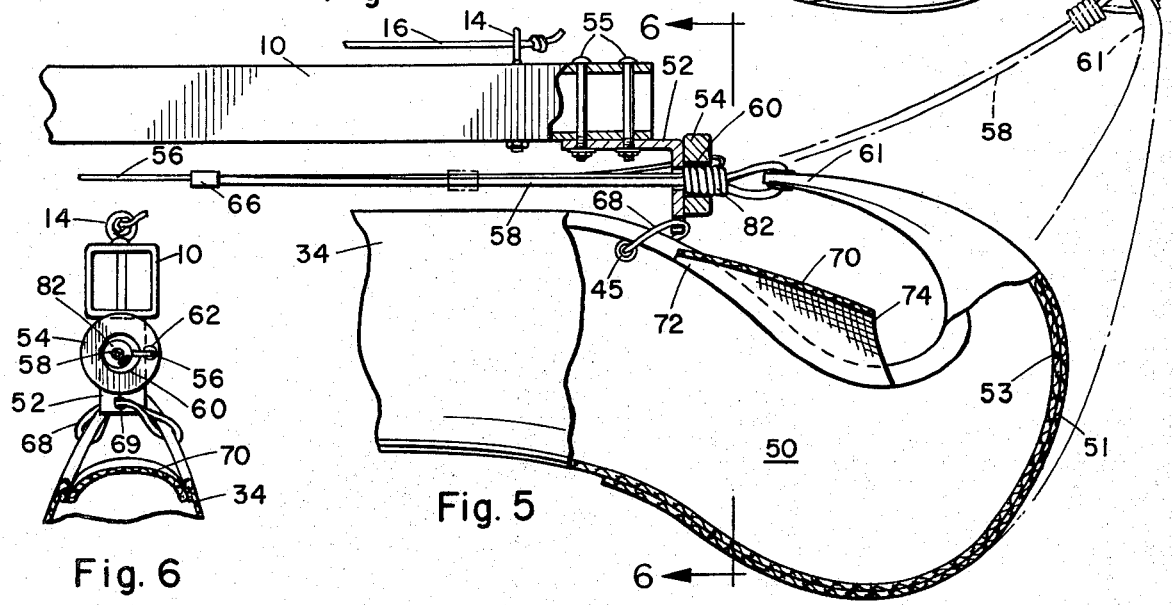
FIG. 5 is a side elevation view partially cut away of the structure of FIG. 4.
Figure 6:
FIG. 6 is a sectional view taken on line 6—6 of FIG. 5.

Flap 53 is coupled to actuating cord 56 by a connector 58 of semi-rigid material, such as plastic covered wire. The connector 58 must bend but have sufficient stiffness to push the flap open, usually assisted by the weight of fruit in the pocket. One end of connector 58 is threaded through a grommet 80 in the end 61 of flap 53, and is wrapped around itself to form a knot or coiled plug 82. The other end of connector 58 is secured to actuating cord 56 by a suitable clamp 66. Connector 58 passes through hole 60 of collar 54 together with actuating cord 56, the hole being large enough to receive the coiled plug 82 with a wedging or jamming fit. By pulling actuating cord 56 in one direction, the plug 82 is thus locked into collar 54, holding the flap 53 and closing pocket 50, as in the full line positiion in FIGS. 1 and 5. When the actuating cord is pulled in the other direction, the friction of the cord on plug 82 pulls the plug out of hole 60, and connector 58 extends to open the flap, as in the broken line position in FIGS. 1 and 5.

As fruit is collected in the pocket the apparatus becomes heavier, but the weight at the lower end tends to balance the weight of the upper portion of the pole. The picker is thus much easier to handle than if the fruit were collected at the top. Since the cutter pull cord and flap actuating cord extend for the full length of the pole, the apparatus can be operated from any holding position along the pole. This is particularly advantageous when the operator is on a ladder, since the pole can be lowered to the ground and the pocket opened from the upper portion of the pole to unload collected fruit.

If the sleeve becomes obstructed by twigs, leaves, or other debris, the constricting band or bands can easily be stretched or loosened to open the sleeve and allow the debris to be shaken out.

Having described my invention, I now claim:

1. In a fruit picker apparatus having an elongated pole with a fruit stem cutter mounted on one end thereof and cutter actuating means extending to the other end, the improvement comprising:
    an elongated sleeve of compliant material attached coextensively to the pole;
    one end of said sleeve having an open mouth adjacent said cutter to receive fruit severed by the cutter;
    said sleeve having a fruit receiving pocket at the other end of the pole, said pocket having a flap extending from the sleeve;
    actuating means for selectively holding the flap in return folded position over the end of the sleeve to close the pocket, and extending the flap to open the pocket;
    said actuating means including an endless actuating cord adjustably mounted on the pole and extending substantially the full length thereof for access from any position along the pole, and a connector connecting said flap to said actuating cord;
    a collar mounted on said other end of the pole adjacent said pocket, said collar having a hole through which said actuating cord and said connector pass together, said connector having an enlarged plug portion thereon which is a tight fit in said hole and comprises locking means for holding said flap in the closed position when the actuating cord is pulled in one direction;
    and restricting means encircling said sleeve for restricting the cross sectional area of the sleeve and retarding the passage of fruit therethrough.

2. The apparatus of claim 1, wherein said connector has sufficient stiffness to push said flap open when the actuating cord is pulled in the other direction.

* * * * *